(12) United States Patent
Palmer et al.

(10) Patent No.: US 11,304,426 B2
(45) Date of Patent: Apr. 19, 2022

(54) BACON PRODUCTS AND METHODS OF MAKING SAME

(71) Applicant: Kraft Foods Group Brands LLC, Chicago, IL (US)

(72) Inventors: Andrew A. Palmer, Lake Mills, WI (US); Daniel B. Wilke, Waunakee, WI (US); Timothy D. Schnell, DeForest, WI (US); Randall J. Glynn, Fall River, WI (US)

(73) Assignee: KRAFT FOODS GROUP BRANDS LLC, Chicago, IL (US)

( * ) Notice: Subject to any disclaimer, the term of this patent is extended or adjusted under 35 U.S.C. 154(b) by 744 days.

(21) Appl. No.: 15/527,199

(22) PCT Filed: Dec. 8, 2015

(86) PCT No.: PCT/US2015/064434
§ 371 (c)(1),
(2) Date: May 16, 2017

(87) PCT Pub. No.: WO2016/094371
PCT Pub. Date: Jun. 16, 2016

(65) Prior Publication Data
US 2017/0354165 A1      Dec. 14, 2017

Related U.S. Application Data

(60) Provisional application No. 62/089,539, filed on Dec. 9, 2014.

(51) Int. Cl.
*A23J 3/22* (2006.01)
*A23L 13/60* (2016.01)

(52) U.S. Cl.
CPC .............. *A23J 3/227* (2013.01); *A23J 3/225* (2013.01); *A23L 13/67* (2016.08); *A23V 2002/00* (2013.01); *A23V 2250/154* (2013.01); *A23V 2250/60* (2013.01)

(58) Field of Classification Search
CPC ............ A23J 3/225; A23J 3/227; A23L 13/67
USPC .......................................................... 426/641
See application file for complete search history.

(56) References Cited

U.S. PATENT DOCUMENTS

| | | |
|---|---|---|
| 3,765,902 A | 10/1973 | Charter |
| 3,793,466 A | 2/1974 | Kawkins et al. |
| 4,057,650 A | 11/1977 | Keszler |
| 4,107,337 A | 8/1978 | Deppner |
| 4,132,810 A | 1/1979 | Knutson |
| 4,171,164 A | 10/1979 | Groves |
| 4,196,222 A | 4/1980 | Cheney |
| 4,200,959 A | 5/1980 | Cheney |
| 4,201,302 A | 5/1980 | Roth |
| 4,305,965 A * | 12/1981 | Cheney ................ A23B 4/0235 426/104 |
| 4,340,994 A | 7/1982 | dos Santos |
| 4,446,159 A | 5/1984 | Roth |
| 4,480,980 A | 11/1984 | McFarland |
| 4,539,210 A | 9/1985 | O'Connell |
| 4,731,906 A | 3/1988 | Matthews |
| 5,100,680 A | 3/1992 | Matthews |
| 5,482,730 A | 1/1996 | Duve |
| 5,688,549 A | 11/1997 | Roehrig |
| 5,698,255 A | 12/1997 | Roehrig |
| 5,762,993 A | 6/1998 | Gundlach |
| 5,830,525 A * | 11/1998 | Cozzini ..................... A23B 4/02 426/641 |
| 5,925,400 A | 7/1999 | Gundlach |
| 6,090,418 A | 7/2000 | Gundlach |
| 6,228,404 B1 * | 5/2001 | Eilert ................... G01N 27/023 324/439 |
| 2005/0170066 A1 | 8/2005 | Greathouse |
| 2006/0141124 A1 | 6/2006 | Schnell |

(Continued)

FOREIGN PATENT DOCUMENTS

| | | |
|---|---|---|
| CA | 1110102 | 10/1981 |
| CN | 101754695 | 6/2010 |
| CN | 102726748 | 10/2012 |

(Continued)

OTHER PUBLICATIONS

NPL mm vs inches retrieved on Jan. 2, 2019 (Year: 2019).*
NPL Marbled slab (2013). (Year: 2013).*
Notification of Transmittal of the International Search Report and The Written Opinion of the International Search Authority, or the Declaration for PCT/US2015/064434 dated Mar. 8, 2016; 6 pages.
Written Opinion of the International Searching Authority, for PCT/US2015/064434 dated Mar. 8, 2016; 8 pages.

(Continued)

*Primary Examiner* — Donald R Spamer
*Assistant Examiner* — Bhaskar Mukhopadhyay
(74) *Attorney, Agent, or Firm* — Fitch, Even, Tabin & Flannery LLP

(57) ABSTRACT

A bacon analogue or a reconstructed bacon product having a first component with about 42% lean meat, such as a lean pork muscle and about 58% fat and a second component with at least about 85% lean meat, such as a lean pork muscle is provided. The bacon analogue may have a ratio of first to second components of between about 35:65 to about 65:35 and a total fat percentage of about 28% to about 48%. In another configuration, the ratio of first to second components is about 25:75 to about 75:25. In one approach, the bacon analogue is free from alginate binders and free of emulsified meat. In one configuration, the first and the second components are ground to a size of about 0.125-inch to 0.5-inch. After the first and second components are separately mixed and cured, the components are pumped together into a marbled slab having an appearance similar to a pork-belly, which may then be sliced.

10 Claims, 13 Drawing Sheets

(56) References Cited

U.S. PATENT DOCUMENTS

| | | |
|---|---|---|
| 2007/0071878 A1 | 3/2007 | Huebner |
| 2009/0226578 A1* | 9/2009 | Schulz .................. A23B 4/044 426/235 |

FOREIGN PATENT DOCUMENTS

| | | |
|---|---|---|
| CN | 103190633 | 7/2013 |
| GB | 1545125 | 5/1979 |
| JP | S53124653 | 10/1978 |
| JP | S25428852 | 4/1979 |
| JP | S55500849 | 10/1980 |
| JP | S63248371 | 10/1988 |
| JP | H1066543 | 3/1998 |
| JP | 2012090600 | 5/2012 |
| WO | 8000908 | 5/1980 |

OTHER PUBLICATIONS

Rankov, M. et al., "The effect of various thermal processing techniques used with cured Hamburg bacon, on the quality of the final product"; Journal Article 1974, Datbase accession No. FS-1976-07-S-1243 Abstract, XP-002754784.

English translation of Office Action issued in corresponding Japanese Patent Application No. Patent Application No. 2017-529718, dispatched Aug. 6, 2019, 4 pages.

11 Meat Food composition table 2014, Japan, Publishing department of Education Institute of Nutrition, Feb. 10, 2014, pp. 180-186.

Preliminary Office Action Report in Brazil patent Application BR112017012081-0, dispatched Nov. 12, 2019.

Office Action issued in Japanese Application No. 2017-529715 dated Apr. 7, 2020.

Office Action issued in Japanese Application No. 2017-529715 dated Aug. 6, 2019.

\* cited by examiner

BACON PRODUCTS AND METHODS OF MAKING SAME

TECHNICAL FIELD

This disclosure relates generally to meat products and methods of processing, and in particular, to bacon and bacon-like products.

BACKGROUND

Bacon and bacon slices are popular meat items that are typically prepared from pork, though other types of bacon, such as turkey bacon, also are available. One of the most popular forms of bacon is pork-belly bacon, which is cut from a pork belly and has a somewhat streaky appearance with fat or bands of fat through portions of the bacon slice, as shown in FIG. 13.

Though pork-belly bacon is widely popular, it can be expensive because of the limited portion of the pig that comprises the pork-belly. Thus, bacon slices are sometimes formed from other cuts of pork. For example, side-cut pork or back-cut pork may be sliced to provide a sliced pork product. Neither of these sliced cuts is nearly as popular as pork-belly bacon. The side-cut bacon generally has more meat and less fat than typical pork-belly bacon, giving it a flavor and texture distinct from pork-belly bacon. On the other hand, the back-cut bacon also fails to have the flavor and texture of pork-belly bacon because back-cut bacon is typically formed from fatback or pork loin. The fatback bacon is generally considered too fatty by many consumers, and the pork loin bacon is considered too lean by many consumers.

Given the expense of pork bellies from which pork-belly bacon can be sliced and the consumer preference for pork-belly bacon, an economical alternative to conventional pork-belly bacon is likely to be of interest to consumers.

SUMMARY

Pursuant to various embodiments described herein, a pork-belly bacon analogue or a reconstructed pork-bacon product having a first component including at least pork trim with about 42% lean pork muscle and about 58% fat and a second component including at least a lean ham trim with about 85% lean pork muscle or higher is provided. The first component includes the fattier portion of the reconstructed pork-bacon product and the second component includes the leaner portion of the reconstructed pork-bacon product. By one approach, the pork-belly bacon analogue has a ratio of first component to second component of between about 35:65 to about 65:35, by weight. In one illustrative example, the pork-belly bacon analogue has a ratio of first component-to-second component of about 60-to-40, by weight. By another approach, the fattier, first component will comprise about 55% of the product, by weight, (with the first component having an acceptable production range of about 50% to about 60%) such that the first component-to-second component ratio is about 55-to-45, by weight. Accordingly, with such an approach, the leaner, second component will comprise about 45% of the product, by weight, (with an acceptable production range of about 40% to about 50%). Further, the bacon analogue product generally has a total fat percentage of between about 28% to about 48%. By one approach, the pork-belly bacon analogue has a total fat percentage of about 38%, which is similar to that found in conventional pork-belly bacon that is cut from pork bellies.

The first and second components may be separately mixed and cured, prior to pumping the first and second components together into a marbled slab having an appearance similar to a natural pork-belly. The reconstructed pork-belly may then be cut into slices. The pork-belly bacon analogue slices may be arranged into a shingled configuration, and the slices may be individually separated therefrom while generally retaining their slice integrity. In other configurations, the slab may be processed into smaller portions, such as by dicing, to create bacon analogue bits.

By one approach, the pork-belly bacon analogue described herein is free from alginate binders and free of emulsified meat. In some embodiments described herein, the bacon analogues are completely free of any additive binders and/or emulsified meat that may assist with binding the product components. Though additive binders, like alginate, starch, and carrageenan, are used to help bind the meat pieces or components together resulting in a more cohesive product, the processes described herein do not require them because the proteins within the meat are sufficient to retain the configuration of the combined components.

Further, instead of an emulsified meat, the pork-belly bacon analogue generally has a particle size with a somewhat coarse ground appearance. In one configuration, the first component is ground to a meat piece size of about 0.125-inch to about 0.25-inch such that the meat pieces have a length and width that are between about 0.125-inch to about 0.25-inch. In another configuration, the second component is ground to a meat piece size of about 0.125-inch to about 0.5-inch such that the meat pieces have a length and width that are between about 0.125-inch and 0.5-inch. By another approach, the first and second components are ground to a meat piece size of about 0.0625-inch to about 0.75-inch.

As used herein, a pork trim with about 42% lean pork muscle includes a 42-pork as understood in the art, which typically has a fairly consistent fat-to-lean distribution. Further, pork trim with about 42% lean pork muscle and about 58% fat has a natural component of lean attachment between the lean pork muscle and the fat that results in the two components being mostly physically connected as would naturally be found on a pork carcass. This provides a physical binder or connection between the lean protein and the fat, which provides additional connection between the constituent parts of the first component, the pork trim. Otherwise, if a first component with less physical binding between the lean pork muscle protein and the fat is employed, the fat typically separates out from the remainder of the bacon analogue slice. The fat separation may occur when the slices are cut from the slab or when the consumer peels or separates the slice from the package or other slices to prepare or cook. For example, a pork-belly bacon analogue sliced product with only 20% lean pork muscle would generally be expected to have components that insufficiently bind to the remainder of the bacon analogue sliced product during subsequent processing such as during protein extraction. In addition, if a first component with such a low percentage of lean pork muscle is used, other binders are typically required, such as pre-emulsified lean proteins that can act like an adhesive to hold the various components together.

In one illustrative approach, the second component includes at least one of extra trim ham or chopped ham. Further, the extra trim ham may include at least one of inside pork muscles, outside pork muscles, knuckle pork muscles, or light pork butt muscles. It also is anticipated that the extra trim ham may include a combination of all or some of these muscles. In addition, the chopped ham may include about 95% lean muscle. Furthermore, in one configuration, the second component also has some pork fat trim added thereto. In one illustrative approach, about 85% of the second component is lean ham trim and about 15% of the second component is the fattier, pork fat trim with only 42% lean pork. The 42-pork of the second component may be ground with a plate having openings of about 0.125-inch. The addition of the 42% lean pork into the second component generally resulted in a pork-belly bacon analogue product with an improved texture i.e., it was not as chewy or tough.

Though it is known to use various additive binders in meat products including bacon analogues, the pork-belly bacon analogue product and other reconstructed bacon analogues described herein generally do not rely on alginate or other binders and remain free of such additive binders. Further, the bacon analogues, as described further below, also may not include emulsified meat to bind the various components together into the bacon analogue, though these can be added if desired (as noted below, it is possible to include an emulsified stream as opposed to a ground meat stream). By avoiding reliance on additive binders and emulsified meat, the pork-belly bacon analogue retains a texture and flavor similar to traditional pork-belly bacon and does not become overly tough in texture.

In addition to the first and second components, the pork-belly bacon analogue product may include additional, non-meat ingredients. By one approach, the pork-belly bacon analogue product includes about 90% to about 95% meat, such as pork fat trim and lean ham trim, and about 5% to about 10% additional non-meat ingredients. In one illustrative example, the pork-belly bacon analogue product includes about 93% meat, such as pork fat trim and lean ham trim and about 7% added, non-meat ingredients. The additional ingredients may include, for example, at least one of: ice, water, salt, sugar, antimicrobials and food safety ingredients, such as nitrites, sodium phosphate, cultured celery, cherry powder, cultured corn syrup, cultured dextrose, and buffered vinegar, and cure accelerators such as ascorbates, and smoke flavoring. Other non-meat ingredients may include spices and flavorings, such as black or cayenne pepper, chipotle spices, garlic powder, and inclusions, such as bits of fruit and/or veggies, for example, cranberries, onions, green peppers, jalapenos, garlic, cheese, and peppers, among others. These non-meat ingredients are generally added before or during mixing of the meat components.

In addition, other non-meat ingredients may be included, such as non-meat sources of fat. In this manner, a non-meat fat could be added to improve the fat profile of the product such that it is configured to have less saturated fat and/or sodium. Though some embodiments described herein have a fat profile very similar or nearly identical to natural pork-belly bacon, the processes described herein also may be employed to produce a lower fat or reduced fat bacon analogue having less fat than typical pork-belly bacon. More particularly, the raw uncooked bacon may be lower in fat, and may have a composition of about 60% protein and about 40% fat when fried.

In one illustrative configuration, a process for forming a pork-belly bacon analogue or a reconstructed pork-bacon product may include providing a first meat stream with a pork fat trim of about 42% lean pork muscle, grinding or chopping the pork fat trim with a plate having openings of about 0.25-inch, and mixing the pork fat trim with a first cure mixture. The process also may include providing a second meat stream with a lean ham trim having at least about 85% lean pork muscle or higher, grinding or chopping the lean ham trim with a plate having openings of about 0.5-inch, and mixing the lean ham trim with a second cure mixture. As mentioned above, the second component also may include a portion of pork fat trim, such as 42-pork. In such a configuration, the process also may include grinding or chopping the pork fat trim of the second component with a plate having about 0.125-inch openings and mixing the ground or chopped pork fat trim of the second component with the lean ham trim after the lean ham trim has undergone grinding or chopping with a plate having about 0.5-inch plate openings. By one approach, the second component may include about 85% lean ham trim and about 15% pork fat trim. If the meat is ground, a variety of grinding equipment may be used, such as a knife and plate grinding system. By one approach, a screw knife and plate are used. In one illustrative approach, the ground meat will generally have a circular cross section such that the particulate has a cylindrical appearance. With a plate opening of about 0.25-inch, the cross section of the meat pieces may have a diameter of about 0.25-inch or less. Further, a plate opening of about 0.5-inch will produce meat pieces with a cross section having a diameter of about 0.5-inch or less. On the other hand, a bowl-style chopper may be employed to chop the meat. If the meat is chopped, the meat pieces will generally have an irregular cross section.

In another illustrative configuration, the first meat stream may include about 20% to about 42% lean meat and about 58% to about 80% fat and a second meat stream may include about 72% to about 90% lean meat and about 10% to about 28% fat.

Then, the process provides for pumping the first and second meat streams together to create a marbled slab, which may then be sliced. Prior to pumping the first and second meat streams together, the separately mixed meat streams may be stored to permit time for the meat to cure and develop its flavor and color prior to further processing. By one approach, this storage occurs in a chilled environment.

The meat stream and the mixture are generally mixed for about 15 minutes or less. By one approach, the separate mixing of the meat and the mixtures occurs for about 12 minutes or less. In another exemplary approach, the first component and the first cure mixture are mixed for about 5 to about 10 minutes. Further, the second component and the second mixture also may be mixed for about 5 to about 10 minutes. Further reducing the mixing time of the first component and first mixture resulted in greater rendering, which is generally considered undesirable. This mixing may occur in a mixer, tumbler or similar equipment. By one approach, the mixing occurs in a mixer such as a ribbon mixer or a paddle-style mixer. The process described herein mixes the meat with the respective mixture for a period of time to promote a modest amount of protein extraction or binding between the various components in the pork-belly bacon analogue product. While a natural pork-belly does not require such extraction to form a slab because it is a whole muscle, the pork-belly bacon analogue process balances the need for a modest amount of protein extraction to hold the product together, especially after slicing, and the need to avoid creating too much protein extraction in the product, which can render the resulting product with an undesirable texture that is too tough.

The first and second meat streams that form the pork-belly bacon analogue are not combined until they are pumped together into an extrusion horn. By maintaining a separation between the first and second components before the stuffing operation, the pork-belly bacon analogue product may be formed into a product that resembles traditional pork-belly bacon in both appearance and texture. In one approach, the first and second meat streams are combined at a ratio of between about 35:65 to about 65:35 by weight. In one illustrative configuration, the ratio of first meat stream to the second meat stream is about 60-to-40, by weight, such that a first pump advancing the first meat stream operates faster than a second pump advancing the second meat stream. In yet another approach, the meat streams are combined at a ratio of between about 25:75 to about 75:25, and in one exemplary configuration, the combined ratio of first to second meat streams is about 70-to-30, by weight. When pumping the first and second meat streams together, the first and second meat streams are advanced through an extrusion horn to combine the first and second meat streams into the marbled slab. After the first and second meat streams are pumped together to create the marbled slab, the marbled slab may be thermally processed in a stepped process in which the product temperature does not exceed about 135° F. In one approach, the thermal processing occurs in about two to about twenty-four hours. Further, during the thermal processing, a smoking process may expose the marbled slab to a natural smoke that imparts color and flavor characteristics to the pork-belly bacon analogue. To generate the natural smoke, wood chips may be used. If the natural smoke is incorporated into the thermal process, smoke flavoring may not need to be included in the added ingredients. Though the thermal processing step described herein typically does not cook the product, which remains raw, it does typically provide sufficient heating and subsequent denaturation to connect the first and second components together without significant rendering or fatting out. More particularly, the fat and lean layers in the raw product, formed after the first and second components are pumped together, do not readily separate from one another, at least until cooking, such as frying. Further, the thermal processing helps the individual bacon analogue slices retain their slice identity such that when one pork-belly bacon analogue slice is removed from a shingled package, the components of the slice generally retain their sliced configuration. Though some fat particles may separate when peeling a slice away from an adjacent slice, excessive particle separation does not occur, even though the product is raw. The processes described herein may provide a product with components that are sufficiently bound together, such as through natural bonds, protein extraction, sufficient heating and subsequent denaturation to connect the components of the slice together, without significant rendering or fatting out.

Before and/or after the thermal processing step, the marbled slab may be chilled to less than about 40° F. in 8 hours or less. The marbled slab also may be sliced into pork-belly bacon analogue slices.

In an alternative embodiment, the reconstructed bacon analogue may have only one meat stream or one component. For example, the one meat stream may be comprised of about 70- to 75-pork, such that the composition will have about 70% to about 75% lean meat and about 30% to about 35% fat. By another approach, the meat stream may be comprised of about 70% to about 75% lean meat and about 25% to about 30% fat. Further, such a composition may include the added, non-meat ingredients discussed above and be ground, mixed, thermally processed, chilled, and sliced as otherwise described herein.

In addition to pork, the bacon analogue or reconstructed meat-bacon product described herein may include other species, such as beef, chicken, turkey, duck, goose, ostrich, lamb, goat, bison, or elk, among others. Further, these species can be mixed together such that a bacon analogue slice, slab, or diced bits includes a variety of species, such as, for example, chicken, pork, and/or turkey in one slice, slab, or diced bit.

The pork-belly bacon analogue described herein is an economical alternative to conventional pork-belly bacon, or any of the other side-cut or back-cut bacon alternatives because the pork-belly bacon analogue is not formed from the whole muscles of the pork carcass, but instead, is formed from a plurality of different pork portions. Further, it can be formed of other non-pork species. Thus, consumers can enjoy the traditional pork-belly bacon flavor and texture without the cost associated with pork-belly bacon that is formed from whole muscle pork-belly.

The reconstructed bacon analogues described herein may be provided to a consumer in a number of manners including raw, partially cooked, and fully pre-cooked. In one configuration, a consumer may receive a packaged, cooked, and readily edible food product, such as slices or dices. In other configurations, the consumer may receive an uncooked bacon analogue slice or slab that requires further processing before consumption. In addition to receiving raw and fully cooked (i.e., pre-cooked) bacon analogues, the consumer also may receive a partially cooked product. In this manner, the bacon analogue has undergone some cooking, but the consumer must finish cooking the product.

Further, though a raw product may have undergone some thermal processing (i.e., to solidify the slab or impart certain flavors), a raw product generally has not been heated to a temperature sufficient to kill harmful bacteria and pathogens, such as, for example, about 157° F. A partially-cooked product, on the other hand, may have been raised to a certain temperature denaturing the product's proteins, but generally will not have remained at such a temperature for long enough to fully cook the product or kill harmful bacteria and pathogens, whereas the fully cooked or pre-cooked product generally has been kept at a sufficient temperature for a pre-determined period of time. A fully cooked product generally has about 40% or lower yield, and a partially cooked product generally has a higher yield. Thus, the partially cooked product experiences further yield loss during additional cooking by the consumer.

DETAILED DESCRIPTION

Figure 1:
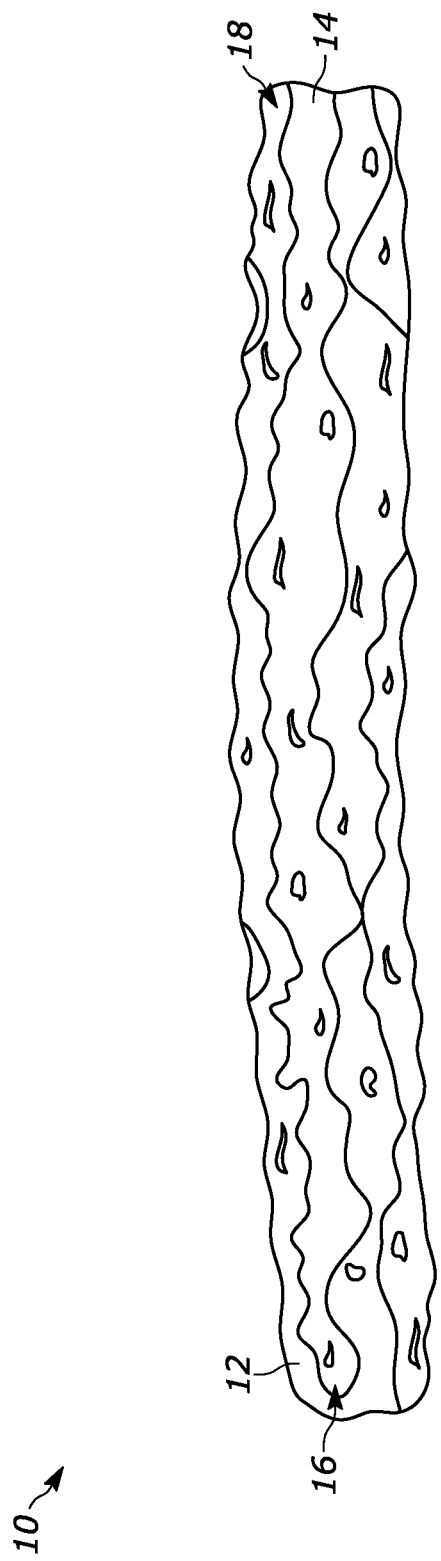
FIG. 1 is a schematic drawing of a slice of bacon.

Various embodiments are described below. Referring to FIG. 1, an illustrative pork-belly bacon analogue slice 10 is shown. The pork-belly bacon analogue slice 10 includes both a first component, which is generally the fattier component 12, and a second component, which is generally the leaner component 14. The first component 12 and the second component 14 are disposed in an arrangement that resembles natural pork-belly bacon with the first component 12 disposed as streaky bands of fat through portions of the second component 14. The first and second components 12, 14 are not distributed evenly within one another and are not homogeneous. Instead, the pork-belly bacon analogue slices 10 include at least one lean layer 16, and may include many lean layers 16, and at least one fat layer 18. A primary lean layer 16 may extend the entire length of bacon analogue slice 10 or the fat component may interrupt the primary lean layer 16. At least one fat layer 18 may extend the length of the bacon analogue slice 10, and it also may be interrupted by the lean layer. As shown in FIG. 1, one of the fat layers 18 in slice 10 may be disposed primarily along an edge of the slice 10 and another of the fat layers 18 may be disposed a distance away from the edge of the slice 10. As can be seen, the bacon analogue slice 10 includes two separate components that are not homogenous, and not emulsified, as discussed below.

Figure 2:
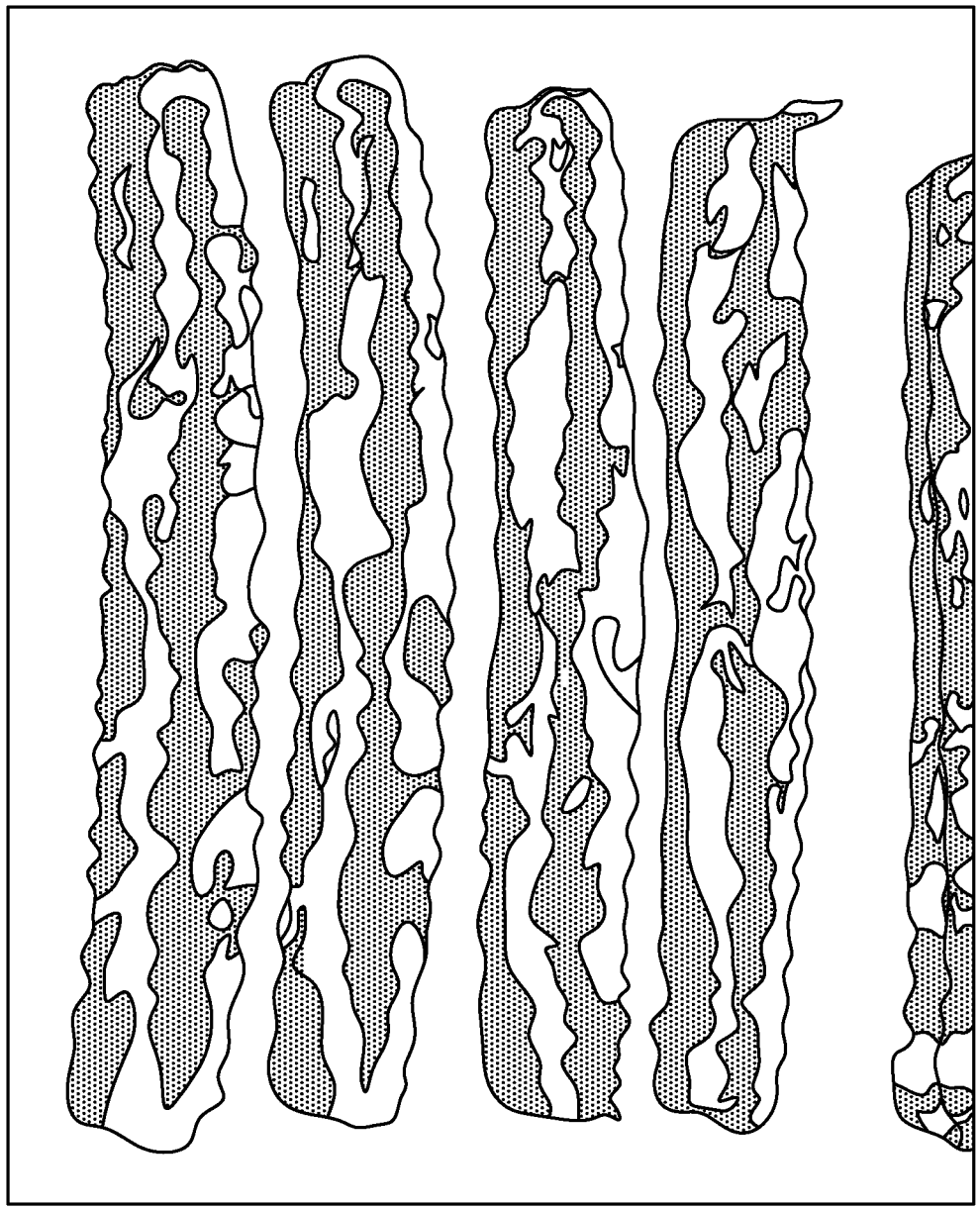
FIG. 2 is a schematic drawing of additional slices of bacon.
Figure 3:
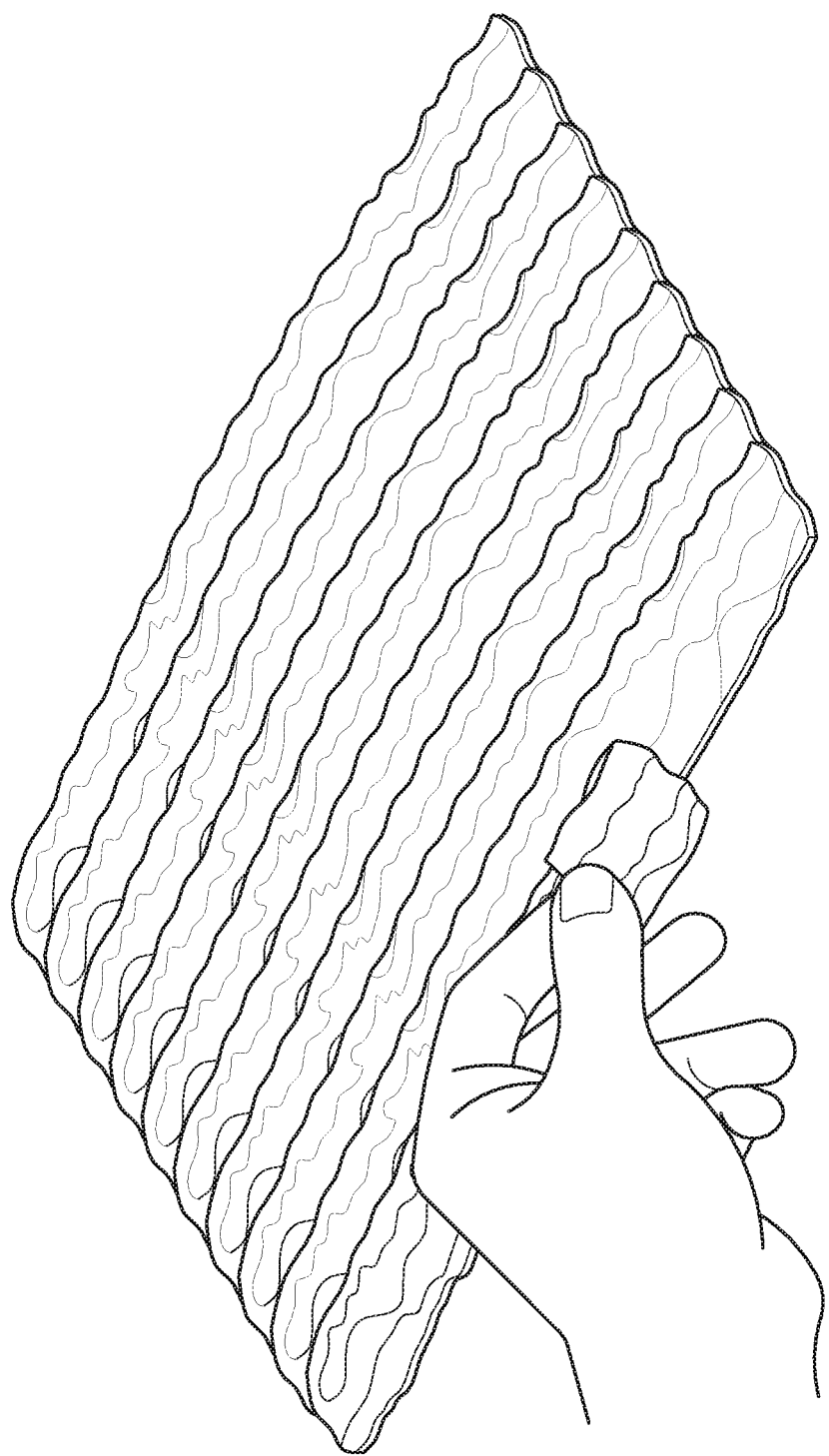
FIG. 3 is a schematic diagram of a shingle of bacon slices.

Another set of bacon slices is depicted in FIG. 2. The bacon slices have a degree of comingling between the fat and lean layers. More specifically, the fat and lean layers have a degree of intermixing between the various components 12, 14, but still retain their visible, distinct nature. The comingling provides for additional interface between the fat and lean layers or components and this may help the components form or stick together and help the slices retain their integrity.

Figure 4:
FIG. 4 is a photograph of cooked bacon slices.

The pork-belly bacon analogue slices 10, though having an appearance similar to that of a conventional pork-belly bacon slice, are not comprised entirely of pork belly meat. Instead, the pork-belly bacon analogue slice may include other cuts of pork, such as, for example, extra trim ham including inside pork muscle, outside pork muscle, knuckle pork muscles, light pork butt muscles, or chopped ham, among others. As discussed below, non-pork meat also may be used to make bacon analogue slices pursuant to these teachings. Despite the composition of the bacon analogue slice 10 being distinct from a traditional pork belly, the bacon analogue slice fries in the same manner such that the fried bacon analogue slice 10 has a fried texture and flavor similar to those of a traditional bacon slice. FIG. 4 illustrates a plurality of bacon analogue slices 10 that have been conventionally fried. The slices 10 exhibit the proper fat release that one would expect with fried bacon.

The first component 12 of the pork-belly bacon analogue slice 10 includes pork fat trim having about 42% pork muscle and about 58% fat. The second component 14 of the pork-belly bacon analogue slice 10 includes a lean ham trim having about 85% lean pork muscle or higher. The second component 14 also may include a portion of pork fat trim with about 42% muscle and 58% fat. In one configuration, 85% of the second component is comprised of lean ham trim and the other 15% of the second component is the fattier pork fat trim or 42-pork. The first component 12 is ground to a meat piece size of between about 0.125-inch to about 0.25-inch such that the first meat pieces have a length and width of between about 0.125-inch to about 0.25-inch and the second component is ground to a meat piece size of between about 0.125-inch to about 0.5-inch such that the second meat pieces have a length and width of between about 0.125-inch and about 0.5-inch. The pork-belly bacon analogue slice 10 may be formed of about 35% to about 65% of the first component and about 35% to about 65% of the second component. By one approach, the first component will comprise about 55% of the product (with the first component having an acceptable production range of about 50% to about 60%) such that the first component-to-second component ratio is about 55-to-45, by weight. Accordingly, in such a configuration, the second component will comprise about 45% of the product (with the second component having an acceptable production range of about 40% to about 50%). Further, the fried bacon-analogue slice 10 may have a total fat percentage of between about 28% fat to about 48% fat. By one illustrative approach, the slice 10 contains about 38% fat.

In another illustrative configuration, the first meat stream may include about 20% to about 42% lean meat and about 58% to about 80% fat and a second meat stream may include about 72% to about 90% lean meat and about 10% to about 28% fat.

Figure 5:
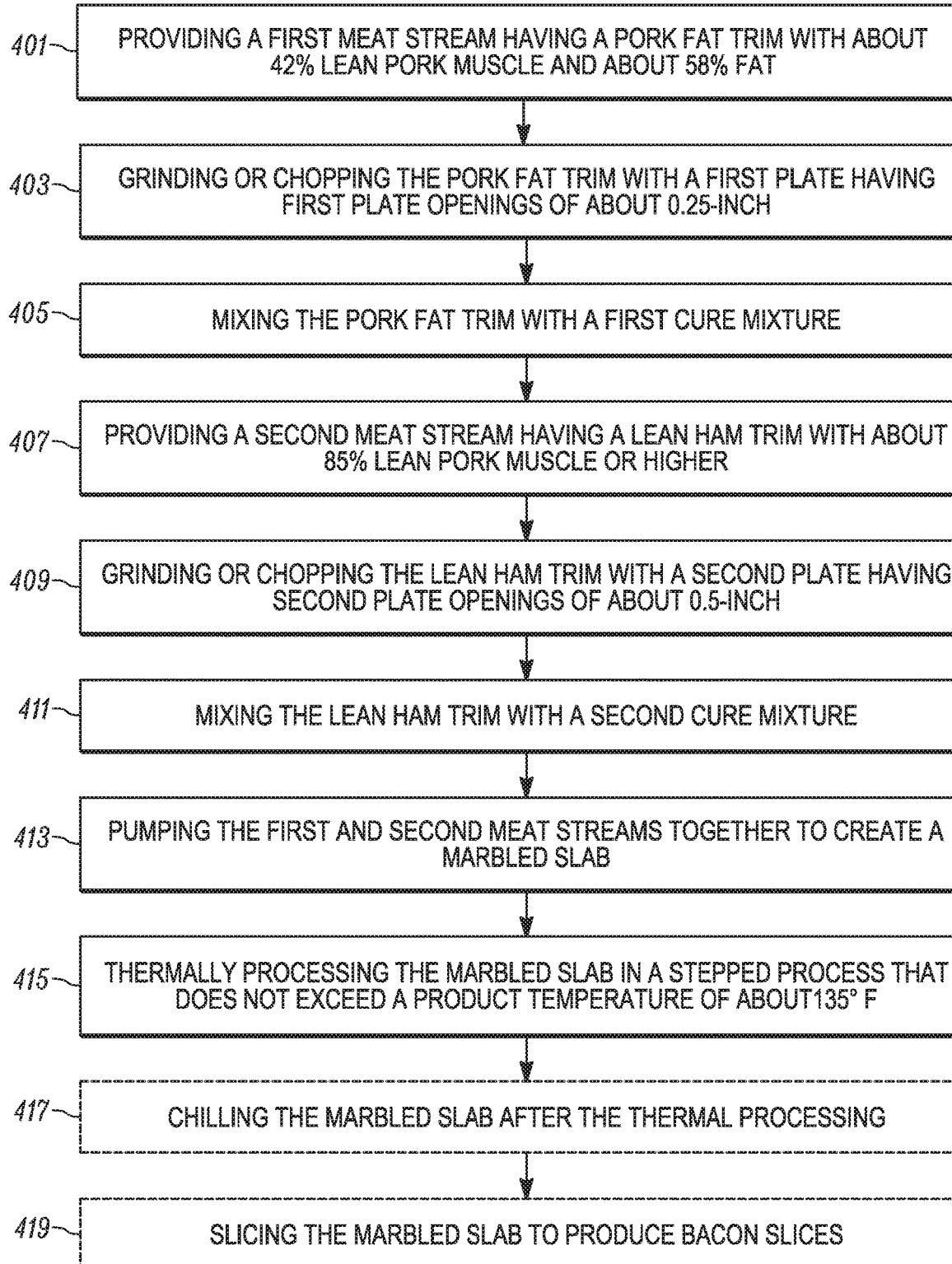
FIG. 5 is a flow diagram of a process.

FIG. 5 illustrates one exemplary process 400 that may be used to make the pork-belly bacon analogue products described herein. The processes described herein also may be modified to produce bacon products comprised of a variety of meat species. The process 400 may include providing a first meat stream having a pork fat trim with about 42% lean pork muscle and about 58% fat. The pork fat trim is then ground or chopped 403 with a first plate having openings of about 0.125-inch to about 0.5-inch. In one illustrative configuration, the plate has openings of about 0.25-inch. In this manner, the pork fat trim is not ground too finely or made into an emulsion that might act as an adhesive between components. Process 400 also includes mixing 405 the pork fat trim with a first cure mixture.

Process 400 also includes providing 407 a second meat stream with a lean ham trim having about 85% or higher lean pork muscle, grinding or chopping 409 the lean ham trim with a second plate having openings of about 0.5-inch, and mixing 411 the lean ham trim with a second cure mixture. The first and second cure mixtures may include, for example, at least one of ice, water, salt, sugar, antimicrobials and food safety ingredients, such as nitrites, sodium phosphate, cure accelerators such as ascorbates, and smoke flavoring. The first and second cure mixtures may include other non-meat ingredients including, for example, spices and flavorings such as black or cayenne pepper, chipotle spices, garlic powder, and inclusions such as bits of fruit and/or veggies, for example, cranberries, onions, green peppers, jalapenos, garlic, cheese, and peppers, among others. In addition, non-meat sources of fat can be added, as noted above. These non-meat ingredients are generally added before or during mixing of the meat. As mentioned above, the first meat stream with pork fat trim having 42% lean pork muscle and 58% fat includes a natural component that binds various portions of the meat stream together. More particularly, the elements of the first meat stream are bound together by naturally present skeletal muscle protein. In addition, as discussed below, the mixing extracts some protein when salt is present and the thermal processing causes a degree of binding between components. Both of these actions help hold the first and second meat streams together once the meat slab is formed from the first and second meat streams.

By one approach, the first and second meat streams are separately mixed for about 15 minutes or less. In another illustrative example, the mixing occurs for about 12 minutes or less. In yet another example, the mixing occurs for between about 5 to about 10 minutes. The mixing time is specifically chosen to achieve the proper balance between encouraging protein extraction in the meat mixtures, which may help the pork-belly bacon analogue product retain its reconstructed structure, and limiting protein extraction to prevent the meat from becoming too tough, which would not result in a product similar to convention pork-belly bacon.

As described in process 400, the pork fat trim of the first meat stream and the lean ham trim of the second meat stream are separately processed, such as during grinding or chopping 403, 409 and mixing 405, 411 and are not combined together until the pumping operation 413. Process 400 also may include letting the pork fat trim and the lean ham trim cure for a given period of time. In some configurations, for example, the pork fat trim of the first meat stream and the lean ham trim of the second meat stream can be separately stored to cure for between thirty minutes to twenty-four hours. By storing the pork fat trim and the lean ham trim with the respective first and second cure mixtures prior to combining or pumping the first and second streams together, additional curing and flavor development may occur. Nonetheless, depending on the desired final product, in some embodiments, process 400 may not include any additional cure time.

Process 400 also includes pumping 413 the first and second meat streams together to create a marbled slab. In addition to pumps that advance the first and second meat streams, an extrusion horn (described below) may be connected to the pumps such that the extrusion horn combines the first and second meat streams into the marbled slab. The marbled slab will have a configuration similar to that described above with respect to the pork-belly bacon analogue slice 10. Specifically, a cross section of the marbled slab will appear similar to that of the pork-belly bacon analogue slice 10 illustrated in FIGS. 1 and 2 and described above. Thus, the marbled slab will have at least a primary lean layer that extends approximately through the width of the marbled slab and at least one fat layer approximately disposed nearly the entire width of the marbled slab. As noted above, though the lean and fat layers may be continuous or nearly continuous such that they extend from one side of the marbled slab to the other without interruption, the layers also may be interrupted by other layers.

As mentioned, the pumping step 413 of process 400 initially combines the first and second meat streams. By one approach, the first and second meat streams are combined at a ratio of first meat stream to second meat stream of about 25:75 to about 75:25 by weight. In another illustrative approach, the ratio is about 35:65 to about 65:35 by weight. In one exemplary embodiment, the ratio of first meat stream to second meat stream is about 60-to-40 such that a first pump that advances the first meat stream operates faster than a second pump that advances the second meat stream. In another illustrative approach, the ratio of first meat stream to second meat stream is about 55-to-45. After the first and second meat streams have been pumped through the extrusion horn, the combined stream will produce a pork slab having marbling similar to that found in a standard, natural whole muscle pork-belly.

Figure 6:
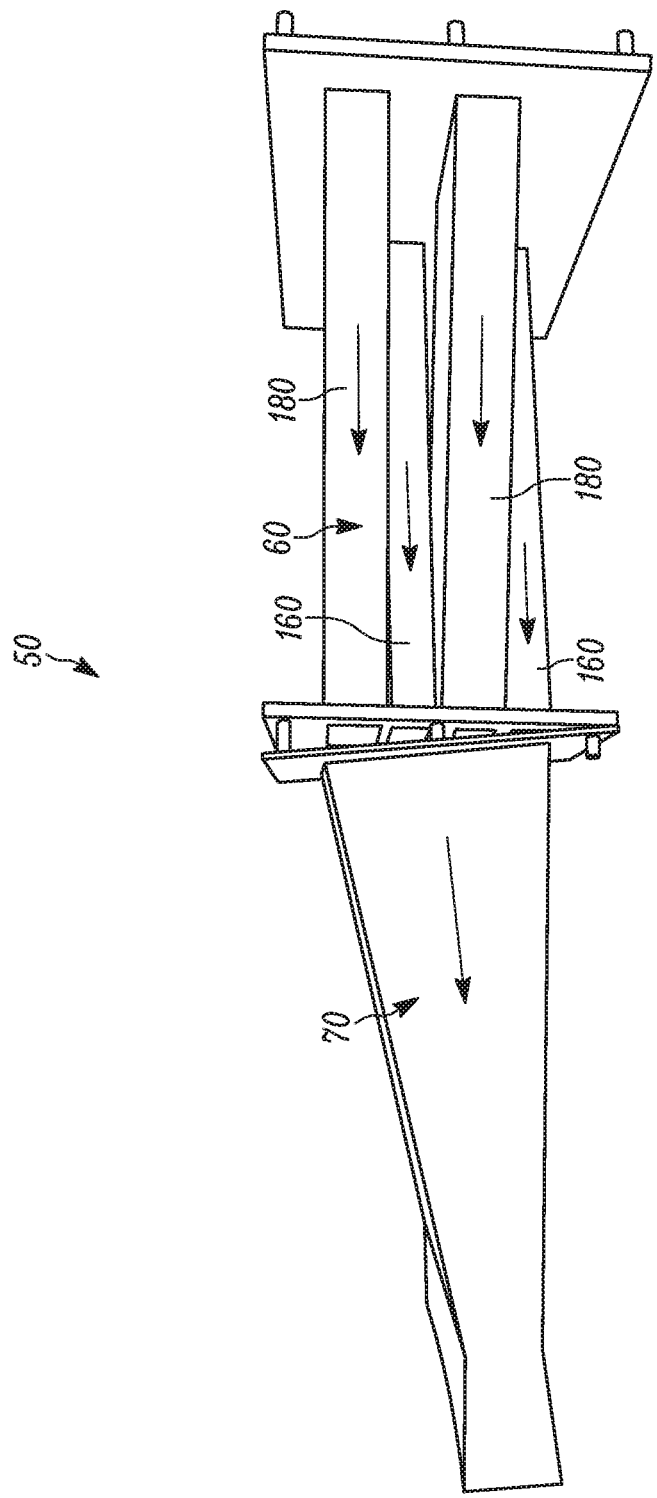
FIG. 6 is a side view of an extrusion horn.
Figure 7:
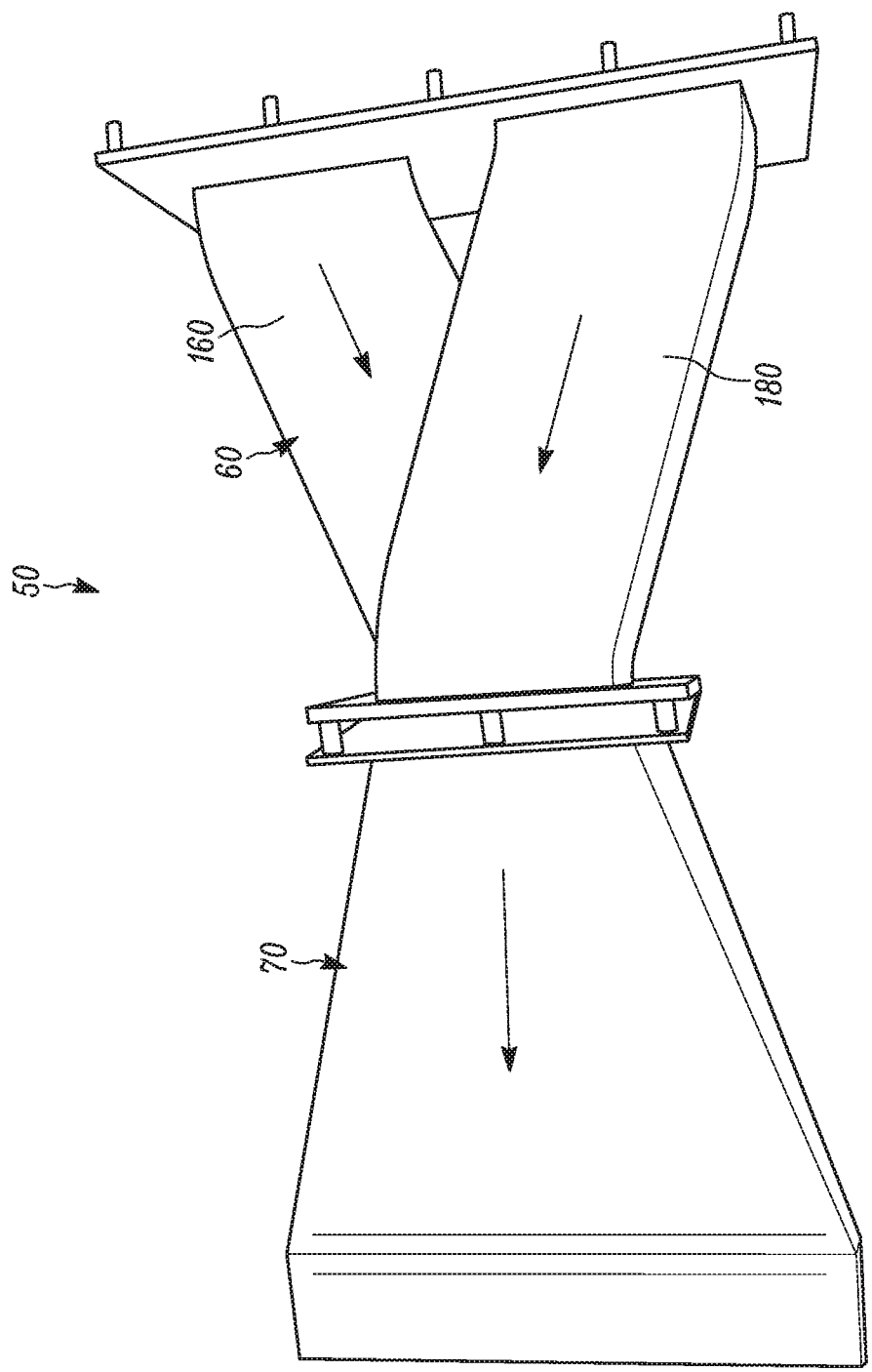
FIG. 7 is a top view of the extrusion horn of FIG. 6.
Figure 8:
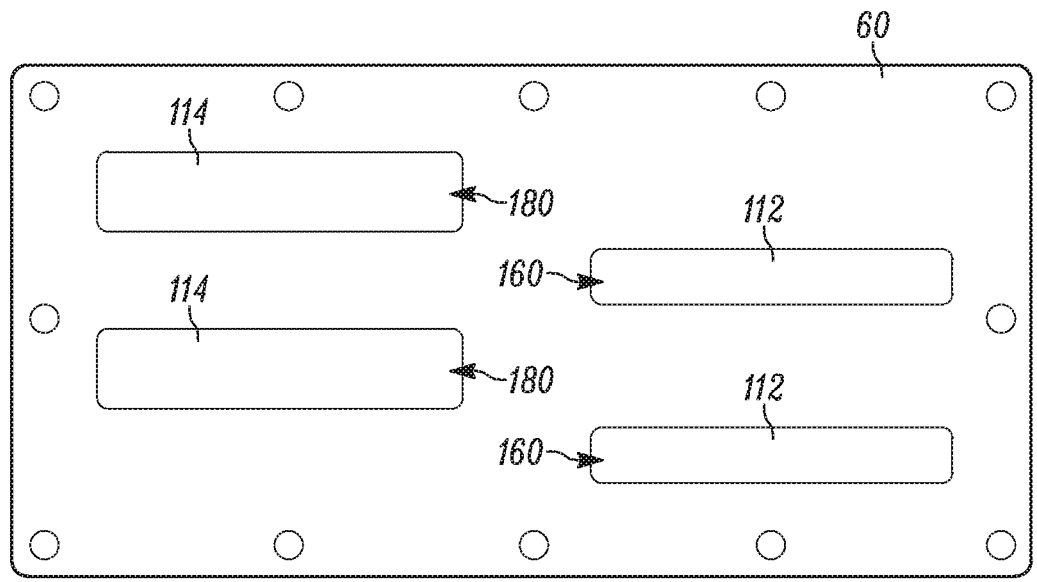
FIG. 8 is an end view of an intake of the extrusion horn of FIG. 6.
Figure 9:
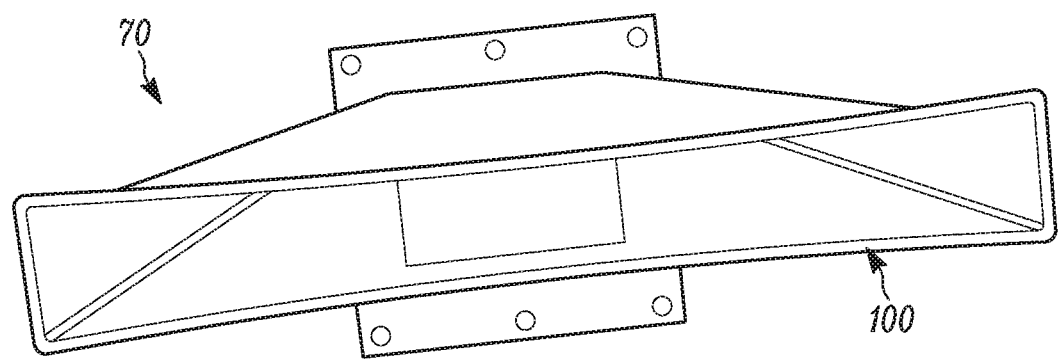
FIG. 9 is an end view of a discharge of the extrusion horn of FIG. 6.

An exemplary extrusion horn 50 that combines the first and second meat streams is illustrated in FIGS. 6-9. The extrusion horn has a first portion 60 and a second portion 70. The first and second meat streams advance through the first portion 60 and to the second portion 70. The first portion 60 has separated channels 160, 180 for the first and second meat streams. The second portion has one opening 100 at a discharge end (FIG. 9). As shown in FIG. 8, the intake end of the first portion 60 has a pair of openings 112 for the first meat stream and a pair of openings 114 for the second meat stream. The openings 112, 114 are connected to respective channels 160, 180. Though the channels 160 are described as having the first meat stream advanced therethrough and the channels 180 are described as having the second meat stream advanced therethrough, the meat streams may be combined in a different configuration. As can be seen in FIG. 6, the first portion has four conduits or separate channels 160, 180. Two of the channels 160 receive one of the meat streams and the other two channels 180 receive the other meat stream. Further, instead of having two meat streams advance through four conduits, the extrusion horn may have more or fewer conduits or meat streams. For example, the extrusion horn may have two, three, four, or more separates conduits.

In addition to having more or fewer channels 160, 180, the process also may incorporate more than two different streams of meat. Alternatively, as noted above, a reconstructed bacon analogue may have only one meat stream or component, such as, for example, a 70- or 75-pork.

In one configuration, the extrusion horn 50 layers the two components together, but there is a notable amount of comingling between the layers formed by the first and second meat streams in the final product. The dispersion of portions of the meat streams into one another is assisted by the pumping action, which occurs under pressure. In addition to the pressure created by advancing a fluid through a pipe, the extrusion horn 50 also may be designed to create pressure by reducing the cross section of the pipe at certain locations. In addition to helping comingle portions of the meat streams, the pressure also helps set the dimensions or shape of the product and helps to preserve the density of the slab. This can be particularly important if the slab is formed without a casing. The slab may be formed without a casing due to the relatively low moisture in the meat streams because the viscosity of the combined batter or streams is stiff enough to form the slab without the help of a casing. In addition, a relatively low temperature helps the slab retain its shape or configuration.

Though the extrusion horn 50 can be used to make a slab that has a rectangular cross section such that the resulting slice is a strip or rectangular in configuration, the extrusion horn can be configured to form any number of shapes. For example, the extrusion horn can be configured to produce slabs and slices with a circular or round and square cross section, among others. In addition to producing slices, the processes described herein also may be employed to produce ends or pieces, such as a product similar to bacon bits. For example, the formed belly slab can be diced to create bacon bits in addition to slices.

Figure 10:
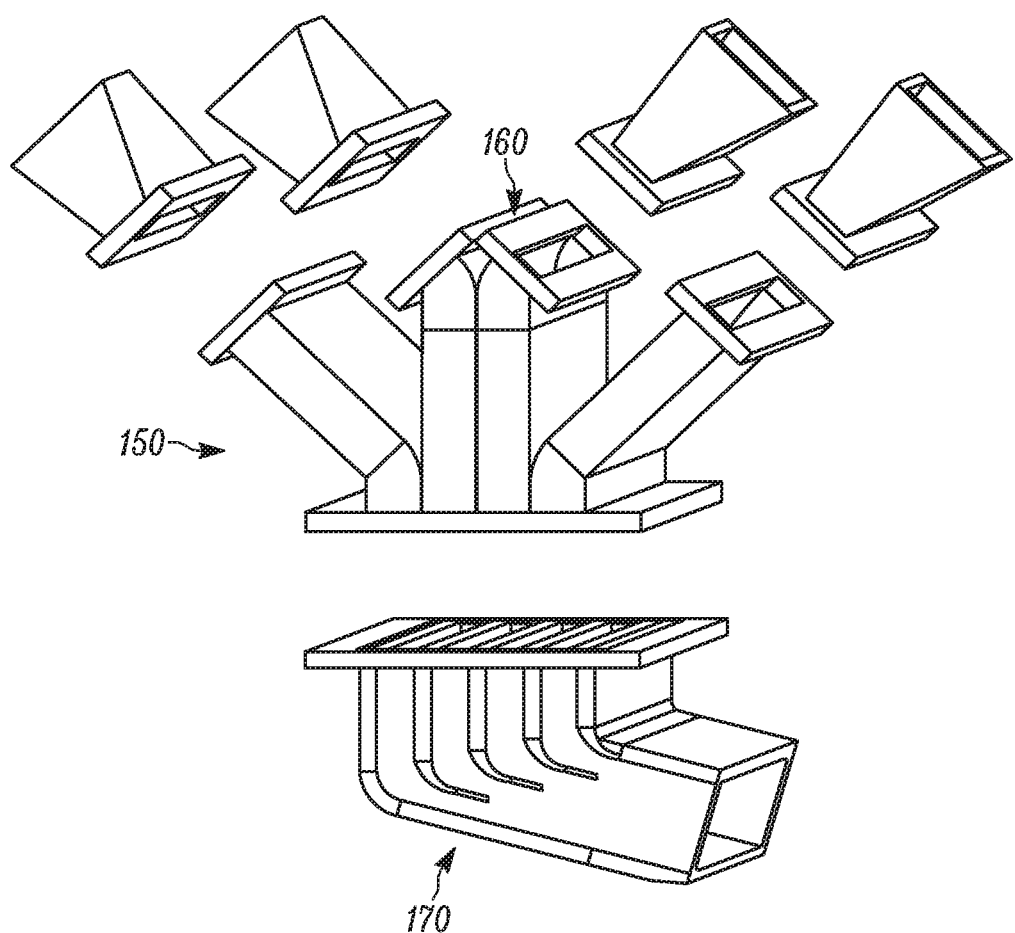
FIG. 10 is a perspective view of another extrusion horn.
Figure 11:
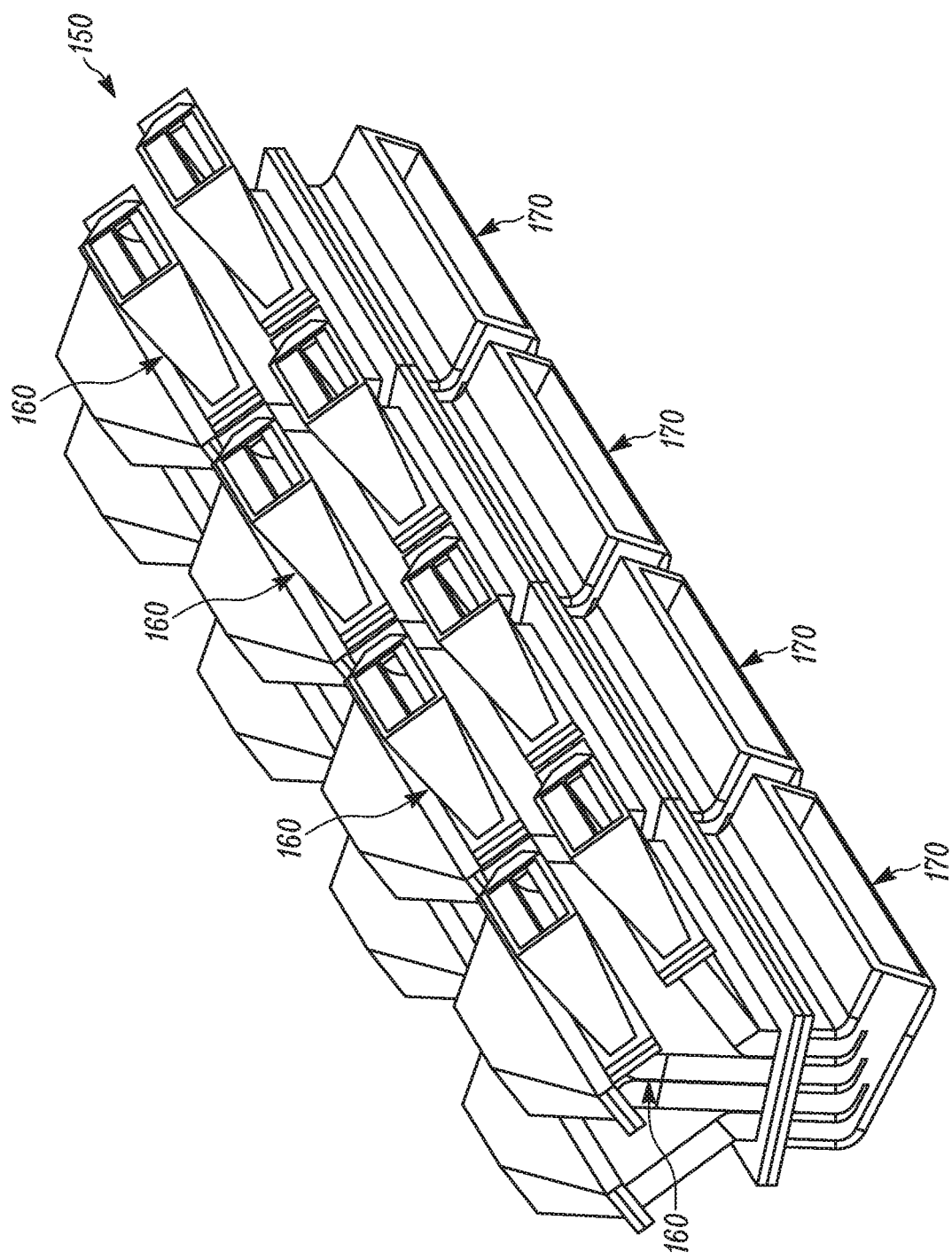
FIG. 11 is a perspective view of a plurality of extrusion horns.

Another exemplary extrusion horn 150 is illustrated in FIG. 10. The extrusion horn 150 functions similarly to extrusion horn 50, but is arranged in a manner that permits numerous extrusion horns 150 to be arranged in a space-saving manner, as shown in FIG. 11.

Figure 12:
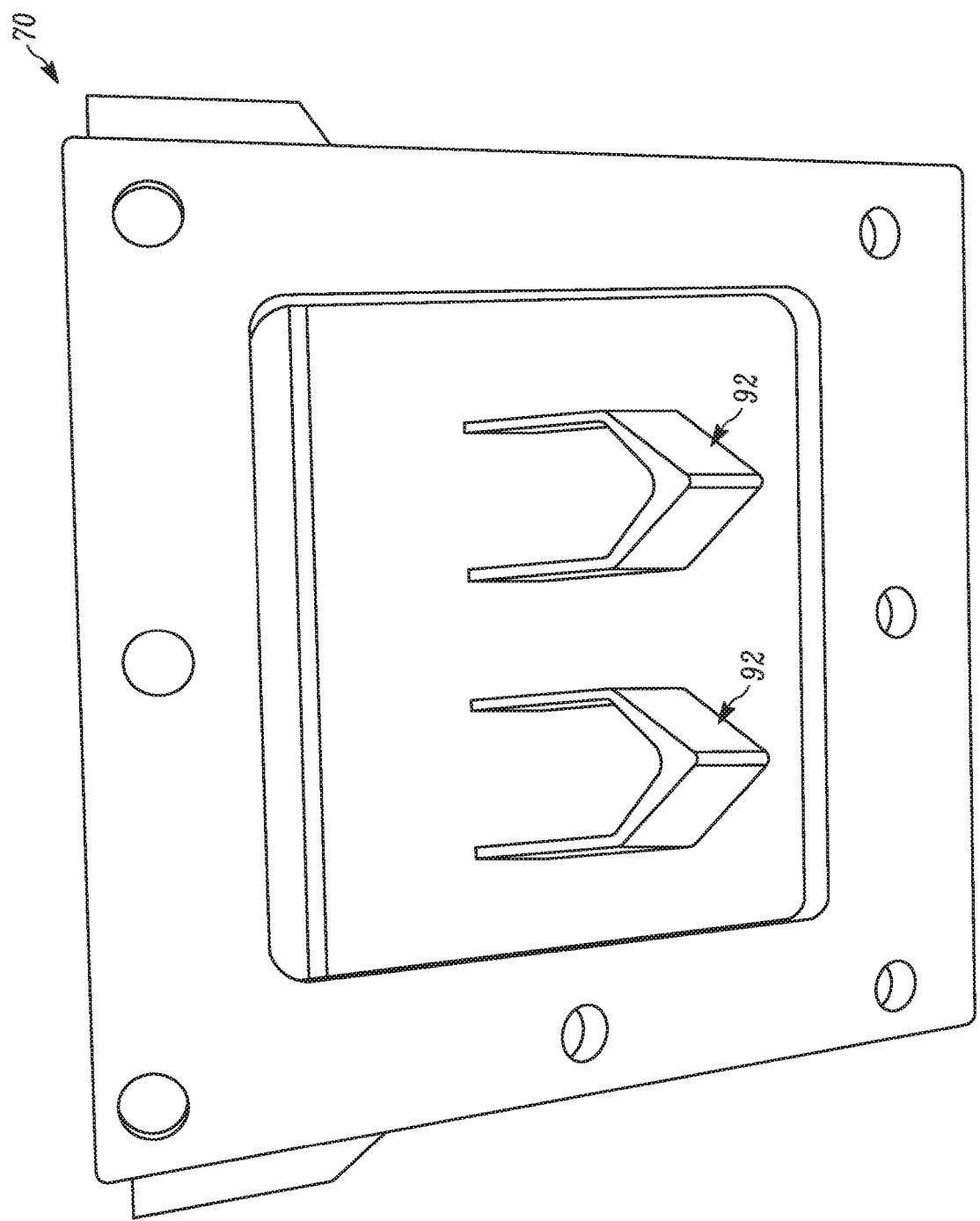
FIG. 12 is a perspective view of a portion of the extrusion horn of FIG. 6.
Figure 13:
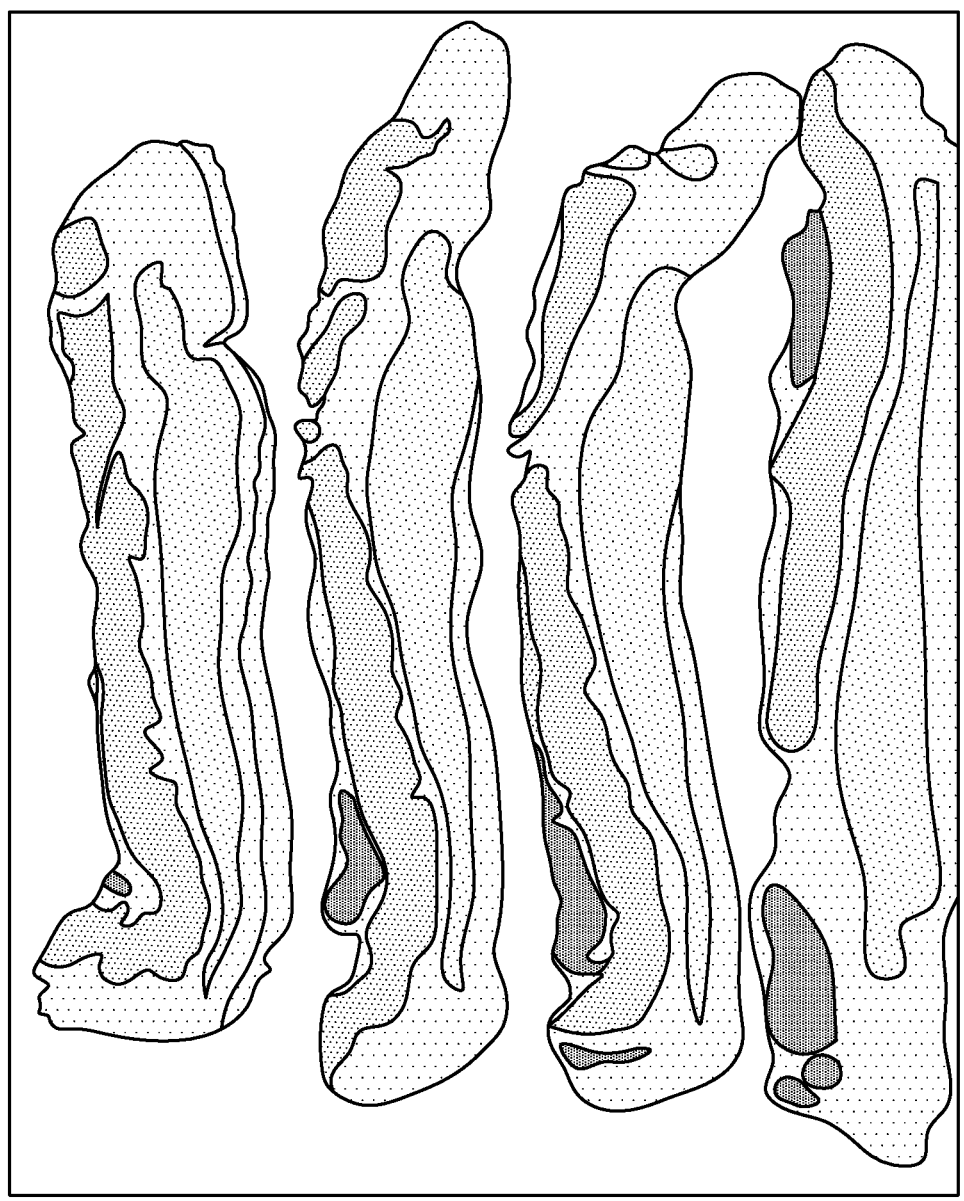
FIG. 13 is a schematic drawing of natural, whole muscle pork-belly bacon slices.

FIG. 12 illustrates a feature that may be disposed on the interior of the second portion 70. In one configuration, flanges are disposed near an entrance or an intake side of the second portion 70, which is slightly downstream, or approximate, the portion of the extrusion horn 150 where the streams are initially combined. The flanges 92 may take a variety of configurations to facilitate disposing the stream components in a wavy or non-linear manner similar to that found in natural or whole muscle pork-belly bacon. In one configuration, the flanges 92 have two prongs that join together at a corner or apex. In such a configuration, the flanges 92 may have a diamond or tear-drop shape on one end and straight and/or parallel extensions extending therefrom. The meat stream may advance over and/or around the flanges toward the exit end of the extrusion horn 50. The flanges 92 create a disruption in the flow of the streams to give the final product variations, as found in sliced pork-belly bacon.

To further create variations in the product slices, a sinusoidal pumping operation may be employed. This pumping operation varies the flow rates of the streams as they are pumped to and through the extrusion horn. For example, if four conduits are employed to form a marbled slab, six pumps are typically used in the operation: two main supply, feed, or drive pumps such that each of the first and second components has one main supply pump and four metering pumps such that each of the four conduits has one metering pump associated therewith. The four metering pumps may be adjusted to provide a sinusoidal pumping operation that creates variations in the final product.

To retain the overall fat/protein ratio within the slice, the overall flow of the first and second streams remains constant. The difference or variation is found or created between the two conduits of the first or second meat stream. In one illustrative example, one of the first stream conduits is increased by a certain amount and the other of the first stream conduits is decreased by a corresponding amount and one of the second stream conduits is increased by a certain amount and the other of the second stream conduits is decreased by a corresponding amount. As the flow rate of one of the conduits gradually increases or decreases, the other of the associated conduit adjusts accordingly. The operation continues in a sinusoidal manner to ensure that as one of the conduits changes, the other of the conduits for the same component is adjusted to retain the desired overall fat/protein profile of the meat slab and slice. Further, many pumps operate in a cyclical manner and the sinusoidal pumping may capitalize on such a cyclical pump to create variations in the product.

After the marbled slab has been formed from the first and second meat streams, the marbled pork slab is thermally processed 415. In one illustrative embodiment, the thermal processing 415 is a stepped process that has a variety of different temperatures. In one illustrative process, the product temperature does not exceed about 135° F. The thermal processing step 415 does not cook the marbled slab or completely denature the proteins therein, however, it is significant enough to provide a degree of binding between the proteins in the marbled slab, which helps retain the shape of the subsequently formed slices.

The process 400 also may include chilling 417 the marbled slab after thermal processing 415 and slicing 419 the marbled slab into pork-belly bacon analogue slices 10. The slicing equipment used in the slicing operation 419 may be any of a number of commercially available slicers, such as a Weber or Anco slicer, though the slicer itself or the blades therein may be modified to produce the desired slice. In one configuration, a slice is about 9-inch long, about 1.25-inch high, and has a thickness of between about 0.0625-inch to about 0.25-inch. In one illustrative embodiment, the slices have a thickness of less than about 0.125-inch.

The marbled slab, after slicing, will produce a pork-belly bacon analogue slice 10, similar to that described above.

Further, the slices 10 retain their slice integrity, even though the slices are formed from two separate components. This occurs by having a natural connection, such as via skeletal muscle, between the proteins in the meat components, by having a degree of protein extraction occur during the mixing 405, 411 of the first and second meat streams with the respective first and second mixtures, and by having a degree of protein denaturation occur during the thermal processing step 415. These various elements are balanced so that, while the slices 10 retain their integrity, the slices also have a flavor and texture profile similar to that of a convention pork-belly bacon slice. Further, proper slice integrity can be observed when one of the slices is removed from a shingled arrangement of multiples slices. A slice 10 with good slice integrity will be able to separate from an adjacent slice while retaining most of its constituent parts. More particularly, though a bit of particle separation may be observed (such as by separation of a few fat particles), excessive particle separation does not occur. In one configuration, the pork-belly bacon analogue slices retain over 95% of their mass during separation, and in some configurations retain over 99% of their mass.

Figure 14:
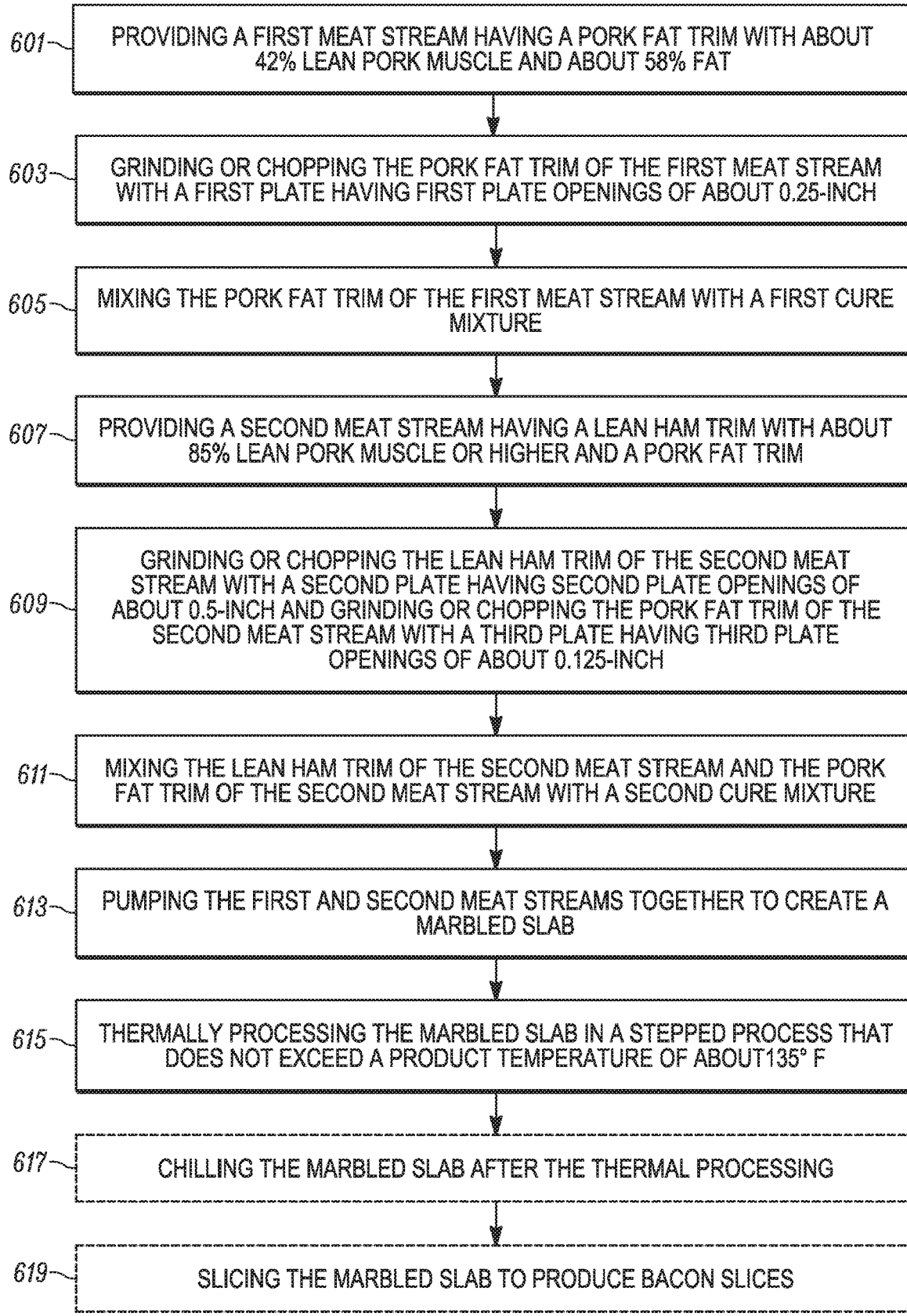
FIG. 14 is a flow diagram of another process.

Another illustrative process 600 is shown in FIG. 14. The process 600 includes providing 601 a first meat stream having a pork fat trim with about 42% lean pork muscle and about 58% fat and chopping or grinding 603 the pork fat trim. The pork fat trim is then mixed 605 with a first cure mixture. The process 600 includes providing 607 a second meat stream having a lean ham trim with about 85% lean pork muscle or higher and a pork fat trim, such as 42-pork. By one approach, the pork fat trim of the second meat stream comprises only 15% of the second meat stream such that 85% of the meat stream comprises the lean ham trim. In step 609 of process 600 the lean ham trim of the second meat stream is ground or chopped with a second plate having second plate openings of about 0.5-inch and the pork fat trim of the second meat stream is ground or chopped with a third plate having third plate openings of about 0.125-inch. The lean ham trim of the second meat stream and the pork fat trim of the second meat stream are then mixed 611 with the second cure mixture.

As noted above, the mixture times may be less than about 15 minutes, about 12 minutes or less, or between about 5 to about 10 minutes. By one approach, the first meat stream and the first cure mixture are mixed for about 10 minutes and the components of the second meat stream and the second cure mixture are mixed for about 5 minutes to about 10 minutes. Process 600, like process 400, includes pumping 613 the meat streams together and thermally processing 615 the combined, marbled slab. Similar to process 400, process 600 also may include chilling 617 the marbled slab and slicing 619 to produce bacon analogue slices.

In one illustrative configuration, pumping 613 may include operating a first pump that advances the first meat stream faster than a second pump that advances the second meat stream. By one approach, the first and second meat streams are combined at a ratio of first meat stream to second meat stream of about 35:65 to about 65:35, by weight. In one embodiment, the ratio of first meat stream to second meat stream is about 60-to-40, and in yet another embodiment, the ratio of first meat stream to second meat stream is about 55-to-45. In other approaches, the meat streams are combined at a ratio of between about 25:75 to about 75:25, and in one exemplary configuration, the combined ratio of first to second meat streams is about 70-to-30.

Though slice integrity might be improved with an emulsified meat, the pork-belly bacon analogue products described herein do not rely on emulsified meat to achieve slice integrity, and may be substantially free from emulsified meat, which helps provide the bacon analogue with a flavor and texture more similar to convention pork-belly bacon when cooked. Further, both the first meat stream and second meat stream have significant visible particle definition, which results from the generally coarser materials used to form the pork-belly bacon analogue slice. Without the emulsified meat, the bacon analogue slice is able to be peeled or separated from other slices in a shingled arrangement without the loss of slice integrity. Further, the ratio and meat compositions described herein provide good fat release when cooking, but ensure that fat is not excessively rendered out prior to cooking, and ensure that the slices retain their formed nature.

Though a reconstructed bacon analogue product, such as that described herein, may be produced without emulsified meat, in an alternative configuration, the second component may be an emulsified fat stream, as opposed to a ground component. In another alternative configuration, a reconstructed bacon analogue product may be produced by grinding or chopping the meat components to a piece size of between about 0.0625-inch to about 0.75-inch.

A wide variety of modifications, alterations, and combinations can be made with respect to the above described embodiments without departing from the scope of the invention. Such modifications, alterations, and combinations are to be viewed as being within the ambit of the inventive concept. For example, as noted above, the processes described herein could be used to produce a reconstructed bacon analogue with species other than pork, such as, for example, beef, chicken, turkey, duck, goose, ostrich, lamb, goat, bison, or elk, among others. Further, these species can be mixed together into a bacon analogue that includes one or more of the species disclosed herein.

What is claimed is:

1. A bacon-analogue product comprising:
    a first component including pork fat trim having about 42% lean pork muscle by weight and about 58% fat by weight;
    a second component including a lean trim having about 85% lean pork muscle by weight or higher;
    wherein the first component has a first meat piece size of between about 0.125-inch to about 0.5-inch and the second component has a second meat piece size of between about 0.125-inch to about 0.5-inch; and
    wherein a ratio of the first component to the second component in the bacon-analogue product is between about 35:65 by weight to about 65:35 by weight and wherein the product comprises a plurality of slices, each of which has an appearance similar to that of a slice of bacon.

2. The bacon-analogue product of claim 1 wherein a total raw fat percentage of the bacon-analogue product is about 28% to about 48% by weight.

3. The bacon-analogue product of claim 1 wherein the second component comprises at least one of:
    an extra trim ham including at least one of inside pork muscles, outside pork muscles, knuckle pork muscles, and light pork butt muscles; or
    a chopped ham having about 95% lean muscle by weight.

4. The bacon-analogue product of claim 1 wherein the bacon-analogue product is free from at least one of alginate binders and emulsified meat.

5. The bacon-analogue product of claim 1 wherein the bacon-analogue product comprises about 90-95% pork fat trim and lean trim by weight and about 5-10% added ingredients by weight.

6. The bacon-analogue product of claim 1 wherein the second component further comprises a portion of pork fat trim.

7. The bacon-analogue product of claim 6 wherein about 85% of the second component by weight comprises the lean trim and about 15% of the second component by weight comprises the pork fat trim.

8. A bacon-analogue product comprising:
    a first component including pork fat trim having about 42% lean pork muscle by weight and about 58% fat by weight;
    a second component including a lean ham trim having 85% lean pork muscle or higher;
    wherein the first component has a first meat piece size of between about 0.125-inch to about 0.25-inch and the second component has a second meat piece size of between about 0.125-inch to about 0.5-inch; and
    wherein a ratio of the first component to the second component in the bacon-analogue product is between about 35:65 by weight to about 65:35 by weight and the first and second components are disposed in an irregular, marbled slab.

9. The bacon-analogue product of claim 8 wherein the marbled slab is configured to be sliced into bacon-analogue slices and arranged in a shingled configuration.

10. The bacon-analogue product of claim 8 wherein the second component further comprises a portion of pork fat trim, and wherein about 85% of the second component by weight comprises the lean ham trim and about 15% by weight of the second component comprises the pork fat trim.

* * * * *